(12) United States Patent
Sampigethaya

(10) Patent No.: US 9,124,580 B1
(45) Date of Patent: Sep. 1, 2015

(54) METHOD AND SYSTEM FOR SECURELY ESTABLISHING CRYPTOGRAPHIC KEYS FOR AIRCRAFT-TO-AIRCRAFT COMMUNICATIONS

(71) Applicant: The Boeing Company, Chicago, IL (US)

(72) Inventor: Radhakrishna G. Sampigethaya, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 292 days.

(21) Appl. No.: 14/175,808

(22) Filed: Feb. 7, 2014

(51) Int. Cl.
*G01C 5/00* (2006.01)
*G01R 31/08* (2006.01)
*H02J 1/00* (2006.01)
*H04L 29/06* (2006.01)

(52) U.S. Cl.
CPC ................................ *H04L 63/0869* (2013.01)

(58) Field of Classification Search
USPC ..................................... 701/9; 370/241; 307/1
See application file for complete search history.

(56) References Cited

U.S. PATENT DOCUMENTS

| | | | |
|---|---|---|---|
| 4,200,770 A | 4/1980 | Hellman et al. | |
| 6,285,878 B1* | 9/2001 | Lai ................................ | 455/431 |
| 2007/0055434 A1* | 3/2007 | Kohlmann ..................... | 701/100 |
| 2012/0043808 A1* | 2/2012 | Berkhahn et al. .............. | 307/9.1 |
| 2012/0158219 A1* | 6/2012 | Durling et al. ..................... | 701/4 |
| 2014/0049099 A1* | 2/2014 | Sampigethaya et al. .......... | 307/1 |
| 2015/0016271 A1* | 1/2015 | Lee ................................ | 370/241 |
| 2015/0023437 A1* | 1/2015 | Nguyen et al. ................. | 375/257 |

* cited by examiner

*Primary Examiner* — Thomas G Black
*Assistant Examiner* — Tyler Paige
(74) *Attorney, Agent, or Firm* — John S. Economou

(57) ABSTRACT

A method and system for encrypting communications between two aircraft on the ground at an airport. Each aircraft is coupled to a ground network via a broadband over power line communications (BPL) network, which may be provided via the respective ground power connectors for each aircraft. A mutually authenticated communications channel is established between each aircraft via the ground network. A shared pairwise key is established at each aircraft. The shared pairwise key may be separately established based upon channel state characteristics such as channel attenuation, bandwidth or delay. In the alternative, the shared pairwise key may be shared from one aircraft to the other or may be generated from public keys based upon a predetermined protocol such as Diffie Hellman. Data encrypted using the shared pairwise key may then be transmitted from one aircraft to the other aircraft. The encrypted data may be transmitted via the PBL network or a separate wireless network.

20 Claims, 2 Drawing Sheets

METHOD AND SYSTEM FOR SECURELY ESTABLISHING CRYPTOGRAPHIC KEYS FOR AIRCRAFT-TO-AIRCRAFT COMMUNICATIONS

FIELD

This disclosure relates generally to aircraft communication, and more particularly to a method and system to establish secure information exchange between aircraft at an airport.

BACKGROUND

The amount of software and data in onboard airplane information systems is growing at a rapid pace. Onboard airplane information systems use software and data for cabin systems, avionics, and inflight entertainment systems, among other things. Some software and data may be common across commercial aircraft type and an airline fleet. Airlines are responsible for frequently and timely refreshing all data and software of their aircraft fleet.

The availability of aircraft WiFi or cellular links and airport-based and Internet-based software and data distribution servers streamlines the process of managing large software and big data of aircraft. However, such solutions are limited by the cost of managing airline-owned distribution servers at airports, reliance on Internet connectivity to reach airport-owned distribution servers, and dependence on the last-mile wireless networking availability and throughput at airports.

Moreover, there are some commercial aircraft data that cannot be sent via wireless networks due to regulations governing aircraft communications. Such regulations may someday require that certain types of data, such as aircraft encryption keys, only be transferred to an aircraft when the aircraft is parked at an airport gate and other conditions are met. The other conditions may require that an aircraft must initiate all (wired and wireless) communications with a ground network at an airport. Given this, it is impossible for two aircraft to directly communicate, since neither aircraft can accept a communication initiation request from a networked off-board system.

Accordingly, there is a need for a method and system for mutual authentication and shared pairwise key establishment for securing aircraft-to-aircraft communications.

SUMMARY

In accordance with one or more embodiments, a method for encrypting communications between two aircraft on the ground at an airport. Each aircraft is coupled to a ground network. A mutually authenticated communications channel is initiated between each aircraft via the ground network. A shared pairwise key is established at each aircraft. Data encrypted using the shared pairwise key is transmitted from one aircraft to the other aircraft.

The ground network may be a broadband over power line communications network. The broadband over power line communications network may be provided via the respective ground power connectors for each aircraft.

In a first further embodiment, the shared pairwise key may be established at the second of the two aircraft by transmitting a first test message from a first of the two aircraft to a second of the two aircraft, identifying, at the second of the two aircraft, a first channel state based on receipt of the first test message, and generating a first shared pairwise key based on the first channel state at the second of the two aircraft. The shared pairwise key may be established at the first of the two aircraft by transmitting a second test message from the second of the two aircraft to the first of the two aircraft, identifying, at the first of the two aircraft, a second channel state based on receipt of the second test message, and generating a second shared pairwise key based on the second channel state at the first of the two aircraft. In this case, the channel state may be the channel attenuation, channel bandwidth, or the channel delay.

In a second further embodiment, the shared pairwise key may be established by selectively sending a shared pairwise key from one of the two aircraft to the other of the two aircraft via the ground network.

In a third further embodiment, the shared pairwise key may be established by transmitting a first public key from a first of the two aircraft to a second of the two aircraft via the ground network, transmitting a second public key from the second of the two aircraft to the first of the two aircraft, and at each aircraft, generating a secret pairwise key based upon the first public key and the second public key using a predetermined protocol.

The encrypted data may be transmitted via the ground network in one embodiment. In another embodiment, each aircraft may include a wireless network communication unit and the encrypted data may be transmitted via a separate wireless network coupled to the wireless network communication unit of each aircraft.

Another embodiment provides a system for encrypting communications between two aircraft on the ground at an airport. The system includes a ground network, a first aircraft coupled to the ground network, and a second aircraft coupled to the ground network. The first aircraft and the second aircraft are each configured to initiate a mutually authenticated communications channel between each aircraft via the ground network and to then establish a shared pairwise key at each aircraft. In addition, each of the first aircraft and the second aircraft is configured to selectively transmit data to the other aircraft, the data encrypted using the shared pairwise key.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Embodiments described herein facilitate the secure exchange of information between aircraft at an airport. More particularly, aircraft are enabled to act as a server for other aircraft members of an airline fleet for distributing and collecting information. Updates to software and data systems can be securely propagated through a fleet from aircraft to aircraft, particularly among similar aircraft models. Updates may include, for example, data and software for in-flight entertainment systems, cabin systems, flight control systems, and avionics systems.

Broadband over power line (BPL) communications links enable inter-aircraft information flows that are secure against physical threats and cyber threats. An off-board BPL module is capable of point-to-point and point-to-multipoint communications with other off-board BPL modules connected to an airport power system. The off-board BPL modules are further capable of communicating with onboard BPL modules on aircraft.

Airport power systems and the physical layout of an airline fleet parked at the airport are leveraged to enhance throughput of aircraft-to-aircraft information flows. A ground power unit that includes an off-board BPL module may be used to power and facilitate communication with other aircraft. The off-board BPL module enables real-time peer-to-peer information exchange, point-to-multipoint information exchange, and/or delayed store-and-forward information exchange between and among aircraft. Such off-board BPL modules are secured against malicious insiders, including compromised airline/airport personnel or systems.

Figure 1:
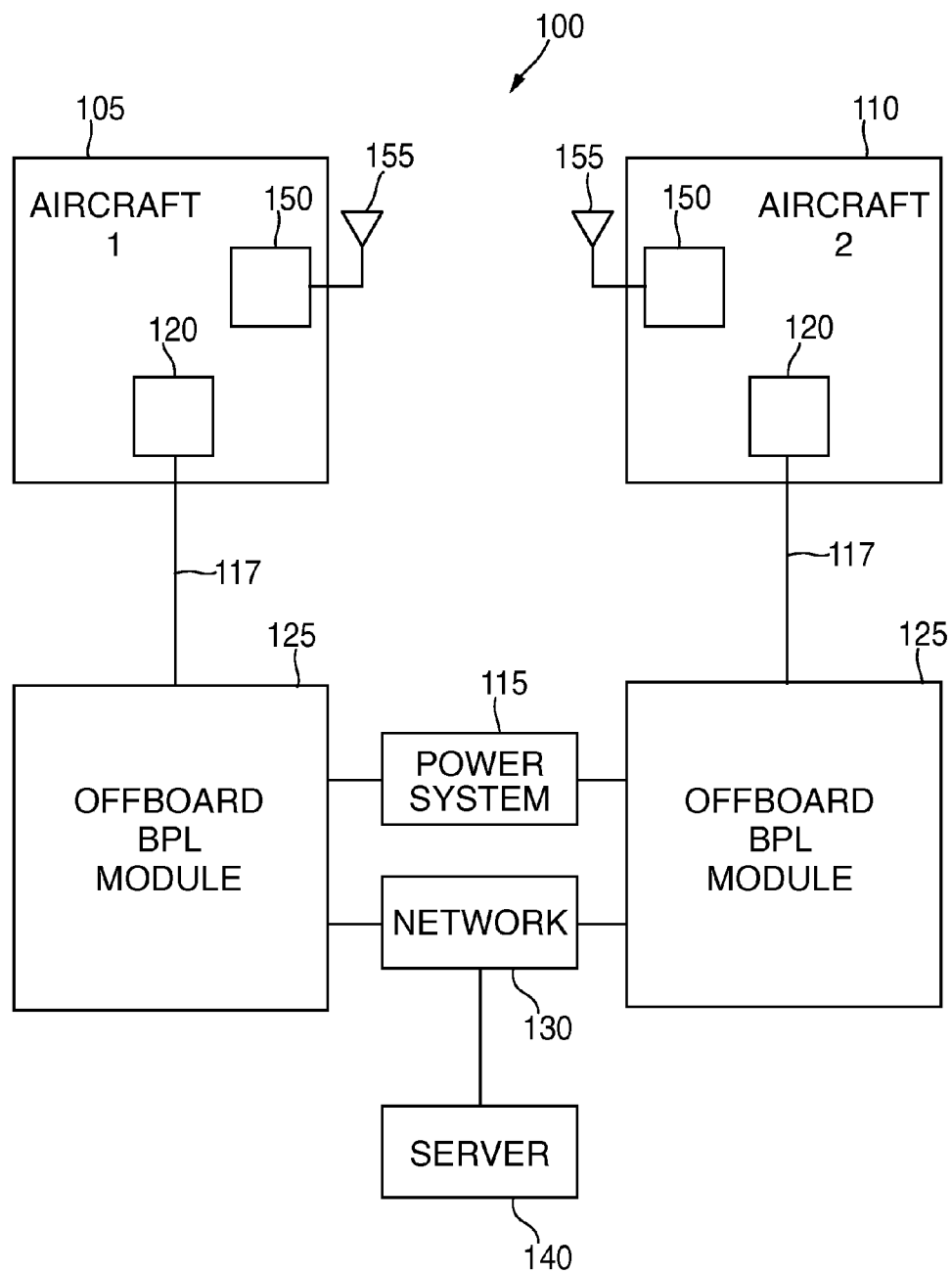
FIG. 1 is a diagram of an exemplary system for exchanging information between aircraft.

FIG. 1 is a diagram of an exemplary system 100 for securely exchanging information between aircraft. System 100 includes a first aircraft 105 and a second aircraft 110 parked at an airport (not shown). System 100 includes a power system 115 that is configured to deliver power to aircraft 105 and 110. Power system 115 may be a conventional power delivery system commonly used at airports. Power system 115 is coupled to aircraft 105 and 110 when aircraft 105 and 110 are parked at the airport. An electrical cable 117 couples each aircraft 105 and 110 to power system 115.

Each aircraft 105 and 110 has an onboard broadband power line (BPL) module 120 that facilitates communication via electrical cable 117. Each aircraft 105 and 110 may optionally include a terminal wireless LAN unit (TWLU) 150 (including associated antenna 155). TWLU 150 enables wireless communications with an associated ground-based LAN (not shown). As one of ordinary skill in the art will readily recognize, other types of wireless communication interfaces may be used. Onboard BPL module 120 is capable of communicating with an off-board BPL module 125 that is coupled to power system 115. Although FIG. 1 illustrates power system 115 being coupled to electrical cable 117 via off-board BPL module 125, one of ordinary skill in the art will readily recognize that other configurations that enable off-board BPL module to function as described herein are possible. Each off-board BPL module 125 is communicatively coupled to an airport network 130. Off-board BPL modules 125 may be coupled to airport network 130 via any type of communication interface, including but not limited to Ethernet, frame relay, ISDN, ATM, WiFi, cellular, and/or any other network, whether a LAN, WAN, or VPN.

Each aircraft 105 and 110 receives electrical power from power system 115 and sends/receives communications to/from airport network 130 via electrical cable 117. In the exemplary embodiment, each aircraft 105 and 110 communicates via onboard BPL module 120 using TCP/IP, however other suitable protocols may be used. Electrical cable 117 may be physically secured to facilitate physical security of communications between aircraft 105 and 110 and airport network 130.

Physical access by a user to off-board BPL module 125 may be restricted. Physical access may be restricted, e.g., by a secure enclosure that requires successful authentication, via credentials, multi-factor crew authentication, digital keys, passcodes, RFID, biometrics, etc., to gain physical access to off-board BPL module 125. Off-board BPL module 125 may include a GPS receiver for verifying that off-board BPL module 125 has not been moved from a pre-determined position. Off-board BPL module 125 may be configured with a secure routing table that facilitates routing information via airport network 130 using pre-determined hops and/or pre-determined destinations. More particularly, off-board BPL module 125 may be configured to route information to a pre-determined aircraft using a pre-determined off-board BPL module. Off-board BPL modules 125 may be identified and/or addressed by a hardware identifier such as a MAC address. Off-board BPL module 125 may include a display and input devices, such as a keyboard, touch screen, mouse, etc., (not shown) for providing a user interface.

Airport network 130 may be communicatively coupled to a server 140. Server 140 may be connected to airport network 130 via a LAN, WAN, and/or the Internet. Server 140 may be configured to provide and receive data to and from aircraft 105 and 110.

In addition to communication between server 140 and aircraft 105 and 110, system 100 enables information exchange between aircraft 105 and 110. More particularly, and as explained in more detail herein, by using the method described with respect to FIG. 2, first aircraft 105 and second aircraft 110 can establish a secure connection for encrypted communication via BPL modules 120 and 125 and via airport network 130. In addition, when the optional TWLUs 150 are included, by using the method described with respect to FIG. 2, first aircraft 105 and second aircraft 110 can also establish a secure connection for encrypted communication via TWLUs 150 and the associated ground-based LAN.

For such encrypted aircraft-to-aircraft communications, each aircraft must initiate a mutually authenticated (wired and/or wireless) broadband communication channel with the other aircraft, and the two aircraft must then establish a shared pairwise key (i.e., a cryptographic key) that can be used to encrypt the broadband information exchanges. For shared pairwise key establishment, a fundamental assumption is the need for a physically secure channel that can distribute the secret key. In particular, as discussed below, the disclosed method and system provides for the establishment of physically secure channels for shared pairwise key distribution or generation between aircraft 105 and 110. As one of ordinary skill in the art will readily recognize, the use of digital certificates as a mutual authentication means for aircraft-to-aircraft communications is much less secure than the presently disclosed system and method because one aircraft's digital certificate cannot be processed by another aircraft without having to include a third-party intermediary in the process. The use of an intermediary, such as a rendezvous server, requires infrastructure costs and makes the system potentially susceptible to cyber threats (e.g., man-in-the-middle attacks).

The BPL communications link is a physically secure channel between the two aircraft 105 and 110 that is, preferably, provided via the aircraft power connection 117 (e.g., the aircraft stinger cable), as shown in FIG. 1. The system disclosed herein provides a number of methods for aircraft to use the physically secure channel to establish a shared pairwise key.

First, each aircraft may leverage channel properties to separately extract the secret key. For example, each aircraft may use channel state information as a basis to generate the secret key. In one embodiment, channel state information can be derived based on the transmission of test messages. In such case, aircraft 105 may send a test message to aircraft 110 over the BPL communications link, and aircraft 110 can then measure the received signal from aircraft 105 and estimate a channel state based on properties of the received signal. Similarly, aircraft 110 can send a test message to aircraft 105 to allow aircraft 105 to similarly measure the received signal from aircraft 110 and estimate a channel state based on properties of the received signal. Since in most cases it can be safely assumed that the channel state information is the same, aircraft 105 and 110 each generate/establish a quantity (based on the measured channel state information) that can then be used as a common seed to generate a secret shared pairwise key. Channel properties that can serve as potential seed for establishing the secret key include channel attenuation, channel bandwidth and channel delay estimates.

Second, the physically secure channel (i.e., the BPL communications link) may be used to transport a self-generated secret key from one aircraft to the other. For example, aircraft 105 may generate a secret key using a predetermined algorithm. The generated key may then transmitted from aircraft 105 to aircraft 110 over the physically secure channel.

Third, a key agreement protocol such as the Diffie Hellman protocol may be used between the two aircraft. In such case, each aircraft 105 and 110 uses the physically secure channel to transport its own public key and then uses a standard key establishment protocol that results in each aircraft obtaining a shared pairwise key. The physically secure channel here alleviates the need for the key establishment protocol to mutually ascertain the identities of the communicating entities.

Each of the foregoing methods may be used to establish a shared pairwise key. The choice of a particular method depends on the level of trust the aircraft and/or aircraft operator have on the cyber-security of the physically secure channel. If the BPL communications link is completely protected, the second method requires the least effort, as secret pairwise key is transmitted across the channel from one aircraft to the other. If the BPL communications link is somewhat trusted, the first method allows the physical properties of the channel to be used a basis for the random seed generation at both aircraft. If the BPL communications link is not trusted, the use of public keys and the Diffie Hellman protocol (or other similar protocol known to those of ordinary skill in the art) at each aircraft 105 and 110 to establish the shared pairwise key provides the highest level of security.

Figure 2:
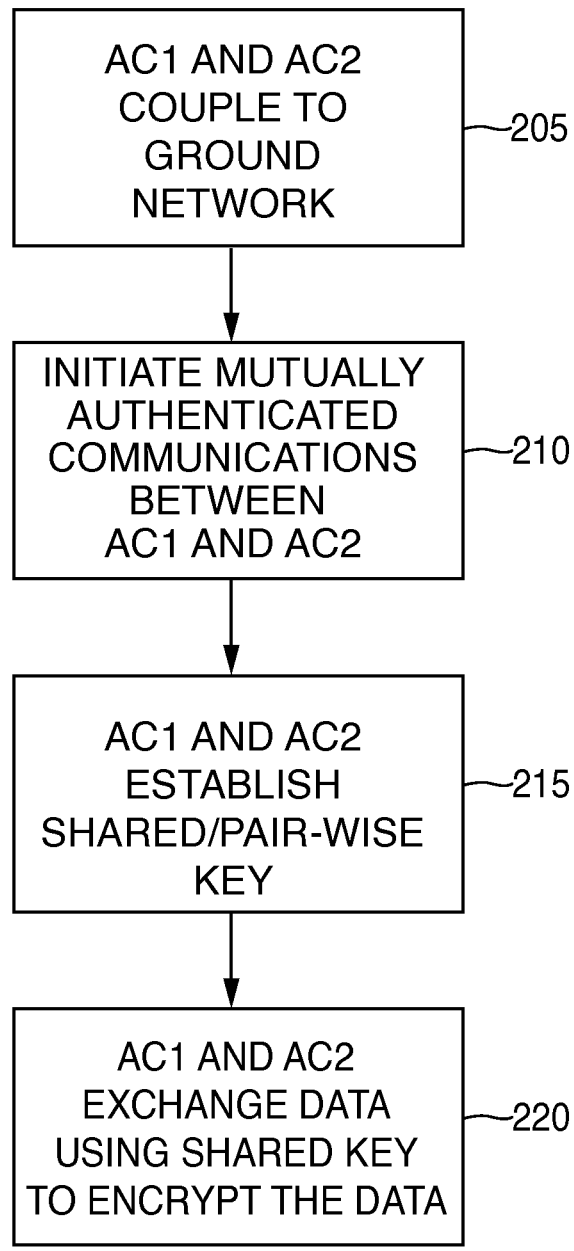
FIG. 2 is a flow chart of an exemplary process for exchanging information between aircraft.

Referring now to FIG. 2, a flowchart is provided of the process for establishing secure aircraft-to-aircraft communications according to the preferred embodiments. First, at step 205 each aircraft (e.g., aircraft 105 or AC1 and aircraft 110 or AC2) is coupled to the respective ground power units by the ground crew and the pilots or other on-board personnel establish a link to the BPL communications link associated with the ground power units. Next, at step 210, a mutually authenticated aircraft-to-aircraft communications link is established between aircraft 105 (AC1) and aircraft 110 (AC2), either via actions taken on the aircraft (which may be either automated or under control of on-board personnel such as the pilot) or via actions taken by ground-support personnel (i.e., by either airline or airport support crew). Next, at step 215, aircraft 105 (AC1) and aircraft 110 (AC2) establish a shared pairwise key for securing aircraft-to-aircraft information exchange using one of the three methods described above. Finally, at step 220, aircraft 105 (AC1) and aircraft 110 (AC2) communicate using the shared pairwise key for encryption to share data over either the wired BPL communications link or, if available, any wireless data links (e.g., as provided by the terminal wireless LAN units 150 and associated ground-based wireless LAN). This method provides several advantages, including the ability of an aircraft to establish a shared pairwise key with another aircraft and to initiate authenticated communications with another aircraft, both without needing an intervening third-party entities.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method for encrypting communications between two aircraft on the ground at an airport, comprising the steps of:
   coupling each aircraft to a ground network;
   initiating a mutually authenticated communications channel between each aircraft via the ground network;
   establishing a shared pairwise key at each aircraft; and
   transmitting data from one aircraft to the other aircraft, the data encrypted using the shared pairwise key at each aircraft.

2. The method of claim 1, wherein the ground network comprises a broadband over power line communications network.

3. The method of claim 2, wherein the broadband over power line communications network is provided via respective ground power connectors for each aircraft.

4. The method of claim 1, wherein the establishing step is performed by the steps of:
   transmitting a first test message from a first of the two aircraft to a second of the two aircraft,
   identifying, at the second of the two aircraft, a first channel state based on receipt of the first test message,
   generating a first shared pairwise key based on the first channel state at the second of the two aircraft;
   transmitting a second test message from the second of the two aircraft to the first of the two aircraft,
   identifying, at the first of the two aircraft, a second channel state based on receipt of the second test message, and
   generating a second shared pairwise key based on the second channel state at the first of the two aircraft.

5. The method of claim 4, wherein the first channel state is one of the channel bandwidth and the channel attenuation.

6. The method of claim 4, wherein the first channel state is the channel delay.

7. The method of claim 1, wherein the establishing step comprises selectively sending a shared pairwise key from one of the two aircraft to the other of the two aircraft via the ground network.

8. The method of claim 1, wherein the establishing step comprises the steps of:
   transmitting a first public key from a first of the two aircraft to a second of the two aircraft via the ground network,
   transmitting a second public key from the second of the two aircraft to the first of the two aircraft, and
   at each aircraft, generating a secret pairwise key based upon the first public key and the second public key using a predetermined protocol.

9. The method of claim 1, wherein the transmitting step transmits the data via the ground network.

10. The method of claim 1, wherein each aircraft includes a wireless network communication unit and wherein the transmitting step transmits the data via a separate wireless network coupled to the wireless network communication unit of each aircraft.

11. A system for encrypting communications between two aircraft on the ground at an airport, comprising:
- a ground network;
- a first aircraft coupled to the ground network;
- a second aircraft coupled to the ground network;
- wherein the first aircraft and the second aircraft are each configured to initiate a mutually authenticated communications channel between each aircraft via the ground network and to then establish a shared pairwise key at each aircraft; and
- wherein each of the first aircraft and the second aircraft is configured to selectively transmit data to the other aircraft, the data encrypted using the shared pairwise key at each aircraft.

12. The system of claim 11, wherein the ground network comprises a broadband over power line communications network.

13. The system of claim 12, wherein the broadband over power line communications network is provided via respective ground power connectors for each aircraft.

14. The system of claim 11, wherein the first aircraft and the second aircraft are each configured to establish the shared pairwise key at each aircraft by receiving a test message from the other of the two aircraft, identifying a channel state based on receipt of the test message, and generating the shared pairwise key at each aircraft based on the channel state.

15. The system of claim 14, wherein the channel state is one of the channel bandwidth and the channel attenuation.

16. The system of claim 14, wherein the channel state is the channel delay.

17. The system of claim 11, wherein the first aircraft and the second aircraft are each configured to establish the shared pairwise key at each aircraft by selectively sending a shared pairwise key from one of the first aircraft and the second aircraft to the other of the first aircraft and the second aircraft via the ground network.

18. The system of claim 11, wherein the first aircraft and the second aircraft are each configured to establish the shared pairwise key at each aircraft by transmitting a first public key to the other aircraft, receiving a second public key from the other aircraft, and generating a secret pairwise key based upon the first public key and the second public key using a predetermined protocol.

19. The system of claim 11, wherein the data is transmitted via the ground network.

20. The system of claim 11, wherein each aircraft includes a wireless network communication unit and wherein the data is transmitted via a separate wireless network coupled to the wireless network communication unit of each aircraft.

* * * * *